US012675602B2

(12) United States Patent
Dinkelmann et al.

(10) Patent No.: US 12,675,602 B2
(45) Date of Patent: Jul. 7, 2026

(54) BIOMETRIC DATA ACCESS

(71) Applicant: AMADEUS S.A.S., Biot (FR)

(72) Inventors: Rainer Rudolf Dinkelmann, Biot (FR); Thomas Landgrebe, Biot (FR); Joshua Merritt, Biot (FR); Peter Horsley, Biot (FR)

(73) Assignee: Amadeus S.A.S., Biot (FR)

( * ) Notice: Subject to any disclaimer, the term of this patent is extended or adjusted under 35 U.S.C. 154(b) by 28 days.

(21) Appl. No.: 18/857,138

(22) PCT Filed: May 19, 2023

(86) PCT No.: PCT/EP2023/063498
§ 371 (c)(1),
(2) Date: Oct. 15, 2024

(87) PCT Pub. No.: WO2023/227483
PCT Pub. Date: Nov. 30, 2023

(65) Prior Publication Data
US 2025/0252213 A1 Aug. 7, 2025

(30) Foreign Application Priority Data

May 23, 2022 (EP) .................................... 22305764

(51) Int. Cl.
*G06F 21/62* (2013.01)
*G06F 21/32* (2013.01)
(52) U.S. Cl.
CPC .......... *G06F 21/6245* (2013.01); *G06F 21/32* (2013.01)
(58) Field of Classification Search
CPC . G06F 21/6245; G06F 21/32; G06Q 10/0635; G06Q 30/0226; G06Q 50/26;
(Continued)

(56) References Cited

U.S. PATENT DOCUMENTS 11,538,125 B1* 12/2022 Shipman, Jr. .......... G06Q 50/26
2013/0110859 A1 5/2013 Hanna et al.
(Continued)

FOREIGN PATENT DOCUMENTS

WO 2022019338 A1 1/2022

OTHER PUBLICATIONS

International Search Report for PCT/EP2023/063498, mailed Aug. 1, 2023, 3 pages.
(Continued)

*Primary Examiner* — Sangseok Park
(74) *Attorney, Agent, or Firm* — PERRY + CURRIER INC.

(57) ABSTRACT

A method of biometric data access in a biometric device environment is provided. The biometric device environment comprises multiple biometric devices, wherein the multiple biometric devices are grouped in multiple biometric device zones and wherein a biometric device zone is associated to one or more biometric databases. The method comprises receiving biometric data of a user and determining an order of one or more of the multiple biometric device zones according to expected access to the biometric data of the user. The method further comprises, in response to a start time being reached, adding the biometric data to one or more of the biometric databases associated to at least a subset of the one or more of the multiple biometric device zones, and, in response to an access progression event, removing and/or adding the biometric data from/to one or more databases associated to a subsequent biometric device zone.

13 Claims, 5 Drawing Sheets

(58) Field of Classification Search
CPC .... G06Q 50/40; G06Q 2240/00; G07B 15/00;
G07C 9/257; G07C 9/27; G07C 9/37;
G07C 9/38; G07C 9/00563
See application file for complete search history.

(56)                    References Cited

U.S. PATENT DOCUMENTS

| | | | |
|---|---|---|---|
| 2020/0105079 A1* | 4/2020 | Maeno ................... | G06V 10/95 |
| 2020/0311238 A1* | 10/2020 | Ackerman .............. | G06F 21/32 |
| 2021/0117524 A1* | 4/2021 | Mckell-Redwood ........................ H04L 9/3231 |
| 2021/0264165 A1* | 8/2021 | Rao ......................... | G06V 20/53 |
| 2021/0342750 A1 | 11/2021 | Hiramoto et al. | |
| 2022/0012320 A1 | 1/2022 | Cornick et al. | |
| 2023/0252594 A1* | 8/2023 | Oliveira ................. | G06Q 10/06 705/13 |

OTHER PUBLICATIONS

Written Opinion of the IDS for PCT/EP2023/063498, mailed Aug. 1, 2023, 7 pages.

* cited by examiner

BIOMETRIC DATA ACCESS

CROSS-REFERENCE TO RELATED APPLICATIONS

This application is the U.S. national phase of International Application No. PCT/EP2023/063498 filed May 19, 2023, which designated the U.S. and claims priority to EP 22305764.7 filed May 23, 2022, the entire contents of each of which are hereby incorporated by reference.

TECHNICAL FIELD

This disclosure relates to biometric systems. In particular, it relates to a method of biometric data access in a biometric device environment.

BACKGROUND ART

In some biometric identification systems, the matching algorithm attempts to find a match for an image acquired of a person who is being identified, amongst a database of registered identities or records. The number of records available for potentially matching with the subject is also referred to as the "gallery size". The amount of time and processing required to find a match amongst a gallery becomes greater as the gallery size increases. The probability of returning an incorrect result also increases when the gallery size increases.

Airports or other passenger terminals can have large numbers of biometric devices, e.g., touchpoints of differing types, where biometric systems may be employed. The touchpoints may store local copies of the gallery or access a central touchpoint database. The addition of each passenger to the central database is triggered by an off-airport or on-terminal enrolment. The gallery for processing at these touchpoints may only include records that have been enrolled within a certain time frame. For instance, the gallery may be refreshed at regular frequencies, such as daily, every few days, etc.

However, even with the refreshing, the gallery sizes can exceed the size associated with an acceptable level of error risk. Each time an error or an exception occurs, the time required to investigate and rectify the issue can incur a significant time cost in terms of the throughput of the touchpoint and the overall processing time. The maximum gallery size which the system at each touchpoint is able to handle can also depend on other factors, such as regulatory factors (e.g., GDPR, or "General Data Protection Regulation"), or technical factors such as storage facility, processing speed, or communication speed.

SUMMARY

In this context, methods, systems and computer program products are presented as defined by the independent claims.

More specifically, a method of biometric data access in a biometric device environment is provided. The biometric device environment comprises multiple biometric devices, wherein the multiple biometric devices are grouped in multiple biometric device zones and wherein a biometric device zone is associated to one or more biometric databases. The method is executed by a biometric data access server system and comprises receiving biometric data of a user and determining an order of one or more of the multiple biometric device zones according to expected access to the biometric data of the user based on an activation schedule.

The method further comprises, in response to a start time of the activation schedule being reached, adding the biometric data to one or more of the biometric databases associated to at least a subset of the one or more of the multiple biometric device zones, and, in response to an access progression event, removing the biometric data from one or more databases associated to a current biometric device zone and/or adding the biometric data to one or more databases associated to a subsequent biometric device zone.

Additionally, a distributed server system of biometric data access is presented. The system comprises multiple biometric databases, wherein multiple biometric devices are grouped in multiple biometric device zones, wherein a biometric device zone is associated to one or more of the multiple biometric databases, wherein the distributed server system is configured to execute the method described herein.

Finally, a computer program is presented that comprises instructions which, when the program is executed by a computer, cause the computer to carry out the method described herein.

Further refinements are set forth by the dependent claims.

These and other objects, embodiments and advantages will become readily apparent to those skilled in the art from the following detailed description of the embodiments having reference to the attached figures, the invention not being limited to any particular embodiments.

BRIEF DESCRIPTION OF THE DRAWINGS

Embodiments will now be described by way of example only, with reference to the accompanying drawings in which

FIG. 3-1 depicts an example of a passenger's token;

FIG. 3-2 depicts another example of a passenger's token;

DETAILED DESCRIPTION

Figure 1:
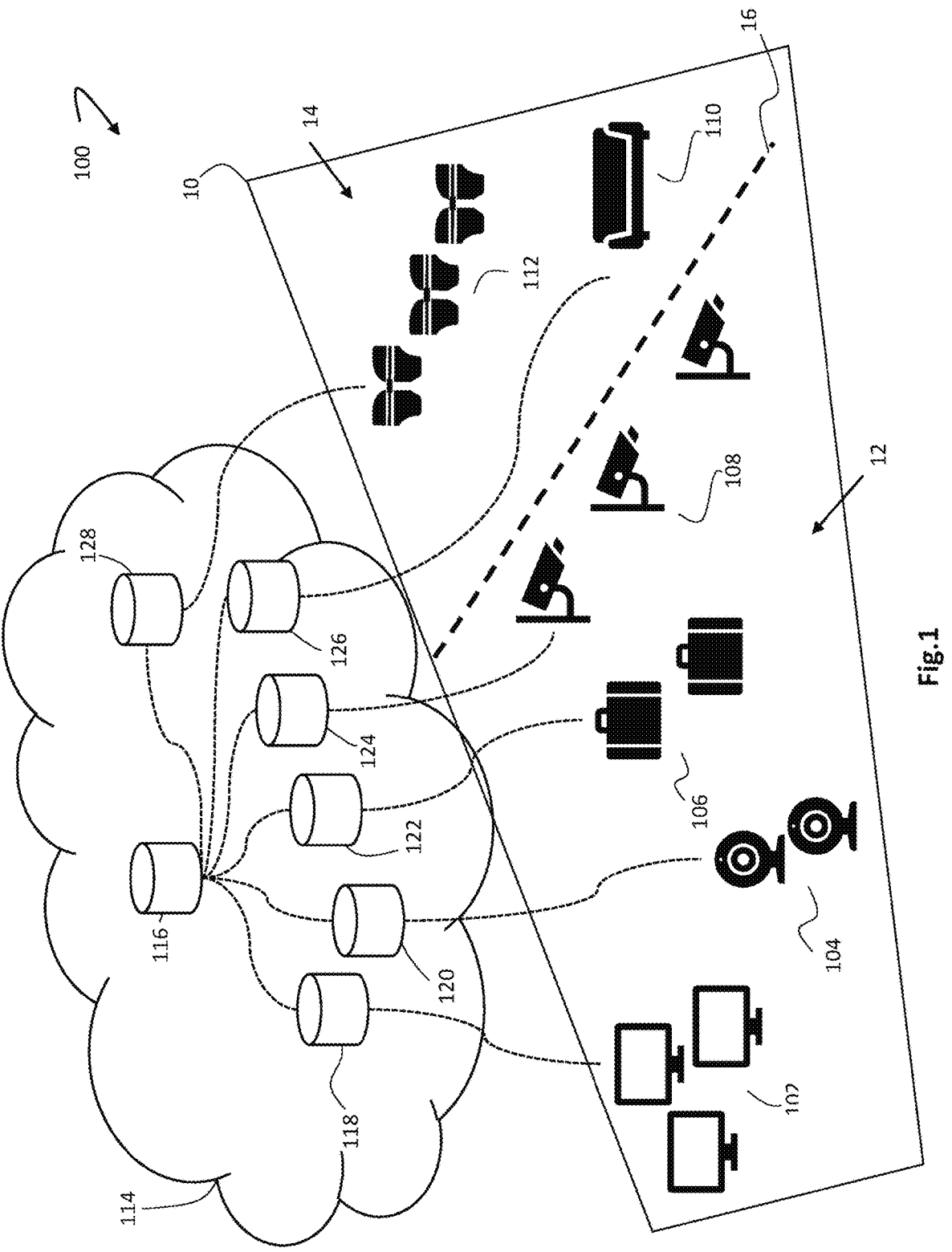
FIG. 1 is a schematic depiction of a biometric device environment at an airport, comprising touchpoints whose galleries are managed by a control platform in accordance with an embodiment the present disclosure.

In the following detailed description, reference is made to accompanying drawings which form a part of the detailed description. The illustrative embodiments described in the detailed description, depicted in the drawings, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

At airports or other passenger terminals, there can be multiple checkpoints where passengers need to be identified. Biometric devices or touchpoints, respectively, may be provided at checkpoints where biometric identification is used. The biometric touchpoint(s) provided will access a central database or store a local copy of a central database which may be regularly updated. However, the central database may present a gallery size, i.e., the number of passenger records included, that is larger than required for some touchpoints, given the highly dynamic nature of passenger travel. The gallery size at the central database may also be of a size that incurs an unacceptable level of error risk, or that is too large for the local system at the touchpoints to efficiently process.

Herein disclosed is a system and method for setting and controlling the gallery sizes at various points in a network of "touchpoints" utilizing biometric identification or biometric devices, respectively. The gallery will not include passengers who choose to opt out of the biometric enrolment process to enable the use of biometrics. The system creates a dynamically modifiable gallery for the touchpoint(s) included in each touchpoint zone in the network of touchpoints. At any time, different galleries may be used for different touchpoints. This may be implemented by configuring the system to move passenger records between different biometric databases so as to dynamically modify the galleries stored therein. A biometric database is also named touchpoint database in the following. sOn a higher level, the system enables an integration between the touchpoint galleries and the transit or throughput dynamics through the network of touchpoints.

Modification to the galleries can be made to remove passenger records which have been flagged as problematic. For example, a local analysis process may be used to analyse each gallery, to see if any two or more identities have biometrics which are calculated to be too similar to each other. For instance, identities having very similar biometric scores, over particular thresholds, may be flagged as problematic.

Modification can be made to reflect the up-to-date flight configuration information for the passengers, or the movements of the passengers through the touchpoint network, or both. The dynamic modifiability is enabled by the selective inclusion or exclusion of enrolled passengers into the various touchpoint galleries. Put another way, this is a selective inclusion of exclusion of available enrolment records into the various touchpoint databases.

In the context of air travel, the selective inclusion or exclusion may be on the basis of flight information or passenger progression. Thus, it depends on one factor or multiple factors, such as but not limited to any one or more of the following:

a correspondence between the current time and date with a scheduled, or where required, updated, flight time information of the flights booked for the enrolled passengers;

a correspondence between the locations of the touchpoints with a scheduled, or where required, updated, airport information in respect of the flights booked for the enrolled passengers;

a correspondence between the zones or locations of the touchpoints corresponding to the touchpoint databases, with areas designated for access by the enrolled passengers;

the progress of individual enrolled passengers through the airport or the network of touchpoints.

further passenger details, such as the quality of enrolment image, or the frequent flyer status of the passenger.

Therefore, embodiments of the biometric data access server system will perform at least one or more of the following actions in order to modify the galleries:

extract or determine a timing information in relation to a flight (e.g., "flight open" window, departure time, etc) corresponding to the enrolment record included in the token of a passenger, and only assign the passenger to any gallery if the current time meets a timing requirement (e.g., time is within "flight open" window, time is before departure time, etc), and further will remove the passenger from the galleries if the timing requirement is no longer met due to a change in the timing information;

extract or determine a flight location information in relation to a flight (e.g., terminal location or departure gate) corresponding to a passenger's enrolment record, and only assign that passenger to galleries for touchpoints in touchpoint zones that match the location information; if the touchpoint zones no longer match the location information due to a change in the location information, then the passenger will be removed from the galleries and then re-assigned to galleries in respect of touchpoint zones that match the new location information. That is, a change in the flight location information in respect of a passenger's flight will trigger a change in the destination touchpoint database(s) for the passenger's token;

extract or determine an airline information in relation to a flight (e.g., airline name) corresponding to an enrolment record, and only add the record to the touchpoint databases specific to the airline;

extract or determine an accessible touchpoint zone information in relation to a flight (e.g., particular airline counters or kiosks as defined by the airline code for the flight) corresponding to an enrolment record, and only assign the passengers to galleries for touchpoints in the accessible touchpoint zone(s). That is, change in the accessible airport zone information will trigger a change in the destination touchpoint database(s) for the enrolment record;

extract or determine information regarding whether the passenger is or will be allowed to enter any restricted access airport area (e.g., particular airport lounges), and include the touchpoint databases for touchpoints in these areas as destinations for the passenger's enrolment record;

extract or determine a touchpoint access permission information in relation to a passenger from the passenger data, or travel data, or both, corresponding to a passenger's travel, and add the passenger's enrolment record to or remove the record from the airport touchpoint databases in dependence of the touchpoint access permission;

monitor DCS transactions in order to track a passenger's progress through the network of touchpoints, in order to dynamically determine a timing of the inclusion of the passenger into different galleries, in accordance to a schedule that defines the order in which the touchpoint zones become accessible by the passenger.

In the below, the system will be described in more detail. The system is described the context of a network of touchpoints in an airport, or another port or hub for a different mode of travel, where biometric identification of passengers is performed. However, it will be understood that the system and method described may have utility in other context or applications, for example, where biometrics are used to control the access of registered persons through various check points, or entry or exit locations, in a premise.

FIG. 1 schematically depicts a biometric device environment or, in other words, a network of biometric touchpoints 100 at an airport 10. Although this is an example of the biometric device environment at an airport, this is not limiting and all described technical features are to be understood to also apply for any other environment.

The network 100 may include touchpoints for different physical or functional zones of the airport, such as a check-in zone, bag-drop zone, security screening one, airport lounge, boarding gate zone. In this example, the different touchpoints include check-in counters (e.g., Airport Common Use Service counters, or "ACUS" counters) 102, biometric kiosks 104 which may be self-serve kiosks, bag drop kiosks 106, security screening points 108, airport lounge touchpoints 110, or boarding gate touchpoints 112. The division between the zones can be finer. For instance, check-in kiosks reserved for different airlines may be considered to be in different touchpoint zones. Furthermore, check-in kiosks reserved for different seating classes or frequent flyer membership may also be considered to be in different zones.

The different types of touchpoints may further be classified according to access restrictions to the touchpoints. For example, the ACUS counters 102, biometric check-in kiosks 104, bag drop kiosks 106, and security screening points 108 are located in parts of an airport 10 where passengers can typically enter without having first obtained the required clearance to enter boarding gate areas.

Also, touchpoints 102, 104, 106, and 108 may be referred to as touchpoints located on the "land side" 12 of the airport 10, or "land side" touchpoints. The airport lounge touch points 110, located at the entry to airport lounges, and the boarding gate touchpoints 112, are in areas of the airport where passengers typically can only enter if they have obtained the necessary clearance to enter boarding areas. Therefore, they may be referred to as touchpoints on the "air side" 14 of the airport 10, or "air side" touchpoints. In FIG. 1, the dashed line 16 conceptually separates the air side 14 and land side 12 of the airport 10.

The touchpoints in the network 100 have connectivity via a communication network to a biometric data access server system, e.g. a biometric gallery segmentation platform 114. The communication network can be a cloud network or a local area network. The gallery control platform 114 includes or has data access to an enrolment database 116 which holds biometric records of all enrolled passengers. The enrolment which adds a passenger record to the enrolment database 116 may be an off-airport performed before the passenger arrives at the airport, or an on-airport enrolment performed after the passenger arrives at the airport.

Data from the enrolment database 116 are selectively included in a plurality of touchpoint databases 118, 120, 122, 124, 126, 128. Each touchpoint database 118, 120, 122, 124, 126 holds passenger tokens. Then tokens include the biometric records which constitute the biometric gallery for access from one or more touchpoints in a corresponding touchpoint zone. In this example, the touchpoint databases include the ACUS counter touchpoint database 118, the check-in kiosk touchpoint database 120, the bag drop touchpoint database 122, a security screening touchpoint database 124, a lounge touchpoint database 124, and a boarding gate touchpoint database 126.

To enable the selective inclusion of a passenger's token from the central token database 116 to the separate touchpoint databases, the reservation data will be added to the enrolment record for a passenger so that the timing of touchpoint activation will match with a time frame defined by the reservation, such as the flight date or flight time.

In some cases, each touchpoint within the same touchpoint zone can only access the same touchpoint database and thus gallery. However, alternatively, each touchpoint in the same zone may be configured to access several galleries, e.g., each in relation to an airline or a flight. This is useful in situations where the touchpoint zones are "common use" zones, where the touchpoints are "common use" and shared by different airlines. The passenger may be prompted to select the airline or flight for the booked travel, for the system to determine which gallery or galleries to use. Thus, a common use touchpoint may need to have access to several galleries, in respect of different airlines or flights, to further reduce the gallery size for the biometric matching. The galleries may be held in separate databases, where passengers flying on different airlines will be included in different galleries. Thus, when the passenger attempts biometric matching at a common-use touchpoint, matching will only preferably occur between the passenger and one of the galleries.

The touchpoints shown in FIG. 1 are non-limiting examples. Not all of the depicted touchpoints need to be included in all embodiments, and some embodiments may have other types of touchpoints.

FIG. 1 depicts a one-to-one relationship for each type of touchpoint with a touchpoint database. However, this does not always need to be the case. For example, touchpoints of the same type may further be divided into different groups or sets according to their operational zones as alluded to earlier. The zones may be defined by locations (e.g., particular gate areas), flight operators (i.e., airlines), seating class, frequent flyer status, etc. For instance, check-in kiosks dedicated for different airlines may be configured to access different touchpoints databases, so that the galleries for different airlines will each only include the biometric data for passengers booked to go on flights operated by the respective airlines. Thus, multiple touchpoints of the same type may be considered to be in different touchpoint zones, and will access different touchpoint databases.

Conversely, the same touchpoint may be configured to have access to different touchpoint databases. For instance, a common-use biometric check-in touchpoint may be available for check-in by passengers travelling on different airlines. For the biometric matching at these touchpoints, the biometric matching engine will have access to the touchpoint databases each containing only the tokens for passengers travelling on a respective airline.

The term touchpoint database as utilized herein may refer to any sort of organized data storage such as relational or non-relational database. The touchpoint databases may be located centrally on-premise (e.g. in a server room of an airport), co-located with the touchpoint devices (e.g. in a storage of a touchpoint device itself), and/or located remotely or in the cloud. Multiple touchpoint databases may be hosted by a single or multiple database system(s) or server(s), i.e. a touchpoint database may be a logical portion of a larger database system.

Figure 2:
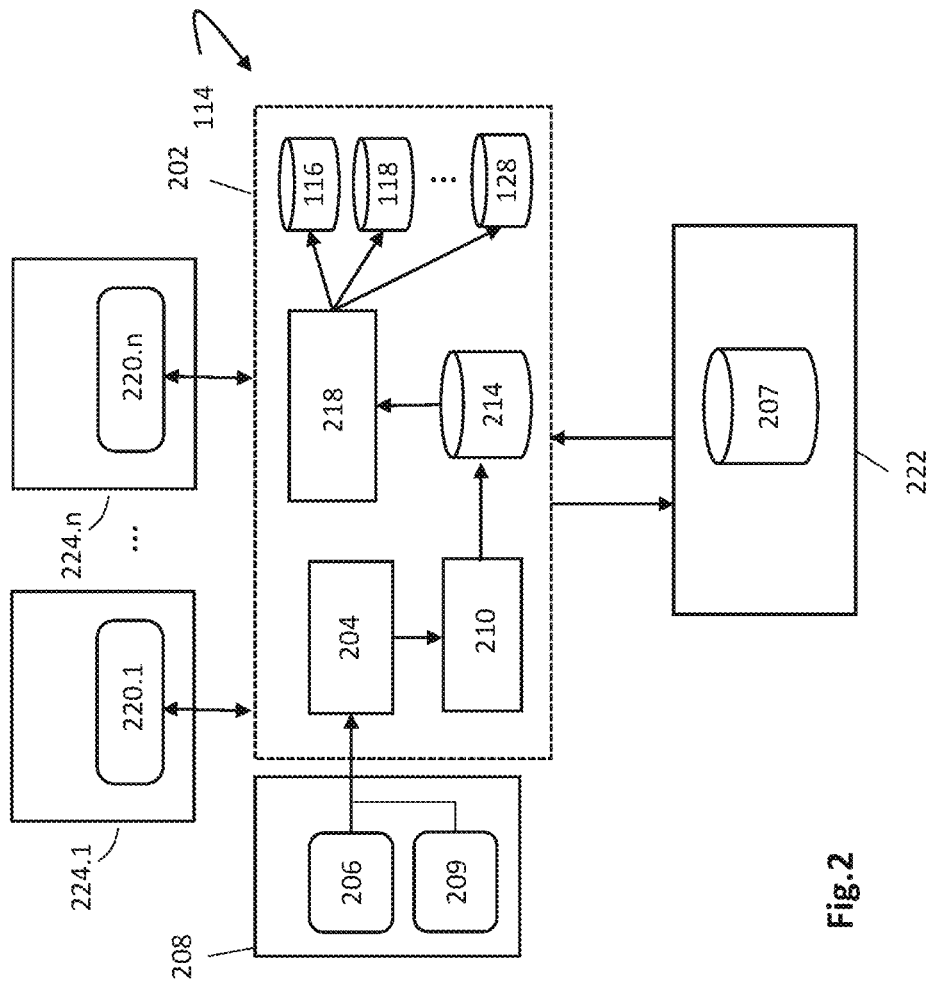
FIG. 2 is a schematic depiction of a biometric data access server system in accordance with an embodiment of the present disclosure.

FIG. 2 schematically depicts a biometric gallery segmentation platform 114. The biometric gallery segmentation platform (which may also be referred to as an identity management platform or biometric data access server system) 114 in this embodiment provides an enrolment server to process passenger enrolments. However, the biometric gallery segmentation platform 114 may alternatively be implemented separately to the enrolment platform, and simply process the data from the enrolment platform.

As shown in FIG. 2, during the initial enrolment, the control platform 114 includes a server or server arrangement conceptually represented by box 202. The sever or server arrangement 202 may include, or have access to enrolment data from, an enrolment server or server module.

In this example, the server or server arrangement 202 is shown to support both on-airport (e.g. biometric enrolment via a common use self-service, or "CUSS" Kiosk) and off-airport enrolment (e.g. enrolment via mobile application). The server or server arrangement 202 supports an enrolment application program interface (API) 204. Passengers can provide biometric enrolment data 206 from their devices 208 via the API 204. The API 204 may be web-based, so that native applications are not required to be installed on the passenger's devices. It will be understood that in alternative embodiments, the server may only support on-airport enrolment.

The server or server arrangement 202 preferably has access to an airport data 207. The access is real time or substantially real-time. The airport data 207 include airport information such as the terminal and gate data for the flights. The airport data 207 specific to a passenger's journey is part of the passenger journey data for the passenger. Aside from airport data 207, there may be other passenger journey data, such as, but not limited to, lounge access, travel class, loyalty information. The other passenger journey data may be available from the booking server (not shown). The airport data 207 is updatable to reflect airport dynamics, such as changes to the gate or terminal for any flights. In FIG. 2, the airport data 207 is shown to be provided from an airport server 222 which is separate to the platform. However, in an alternative implementation, the airport server 222 may be integrated with the platform 114. The communication between the server or server arrangement 202 and the airport server 222 may be bi-directional. For example, the airport server 222 may be configured to be provide updates to the server or server arrangement 202. Additionally or alternatively, the server or server arrangement 202 can fetch the up-to-date airport data.

The server or server arrangement 202 further has communication access to airline departure control systems (DCSs) 224.1, . . . , 224.n, "n" being the number of airline DCSs, to fetch or receive the DCS data 220.1, . . . , 220.n. The data may be provided over a wired or wireless communication network. The DCS data generally includes boarding pass information in relation to a passenger who is booked on a flight. This may be data in relation to the particular flight associated with the passenger's booking. Examples of DCS data include, but are not limited to, airline, flight date, flight open time, passenger seat information, boarding time, flight closed time, flight departure time, and the travel progress of the passenger as reflected by what the DCS transactions have occurred (e.g., whether the passenger has been checked in, completed bag-drop, etc). The platform 114 may be constantly checking for updates in the DCS data. However, where the DCS and the platform are provided by the same entity or where the DCS and the platform are integrated, the DCS may provide push notifications to advise the platform 114 of updates to the DCS data.

As will be described, each of the aforementioned type of data can be used to determine how to segment the central gallery into smaller galleries, so as to minimise the size of the galleries in the touchpoint databases of the various touchpoints.

In some embodiments, an initially scheduled travel data 209 may be provided by the passenger as shown in FIG. 2, such as by entering or uploading booking details or a check-in code. Alternatively or additionally, the scheduled data 209 is provided by a booking system server (not shown). For instance, the scheduled travel information 209 may be grabbed at the time of on-airport enrolment, e.g., by looking up a check-in information where the passenger has already checked in, or by interrogating the airline's reservation database at the check-in counter.

Referring again to FIG. 2, the server or server arrangement 202 includes a mapping module 210 which uses the information taken from the airport data 207, other passenger journey data, or information taken from the DCS data 220.1, . . . 220.n, or both, for a passenger or relevant to the passenger's flight, and map it to the biometric enrolment data 206 of the passenger to create a "token" for the passenger. The mapping module 210 may be implemented by a separate mapping server.

The mapping module 210 may extract from the airport data 207, information such as an airport location data related to the flight. For example, if a passenger's flight is scheduled to depart from a particular terminal, then the passenger's token will only be added to the databases for the touchpoints in that terminal. In embodiments where other passenger journey information is available, the mapping module 210 will also extract from the other passenger journey information, further information such as the passenger's travel class, airline loyalty class or tier, lounge access privilege, etc. This allows segmentation of the created tokens into different, smaller, databases to occur on the basis of airport data and other passenger journey—i.e., assignment of enrolled passengers to different galleries. The number of galleries increases if the segmentation is finer. For instance, for an airport with three terminals, each enrolled passenger will be assigned into one of three different galleries, each for matching at touchpoints in one terminal. However, there can be further segmentation of each gallery. For instance, the gallery for any terminal may be further divided according to various biometric device zones in the terminal, such as any of: one or more check-in zones, one or more bag-drop zones, one or more security zones, one or more boarding gate zones, etc.

As the airport data in relation to a passenger's journey may change (e.g., gate change), the passenger's biometric record may be moved from one gallery to another. In this sense the segmentation of the central gallery into the various aforementioned smaller galleries is responsive to airport dynamics.

However, it may be that the passenger will be assigned to all touchpoint galleries for an airport. In this case the dynamic segmentation of the touchpoint galleries will be driven only by DCS data, to reflect changes in flight data (e.g., flight time).

A benefit of mapping the passenger's biometric enrolment record with DCS data, is that the biometric matching will not be affected by changes to the DCS data, such as seat changes.

Changes in any timing data due to changes in airport dynamics (updates in airport data) or flight dynamics (updates in flight data) may affect the timing that each passenger is assigned to, or removed from, various galleries.

For each passenger, the mapping module 210, using the initial booking information 209 and the biometric information, creates a new passenger enrolment record, i.e., "token", in which the biometric information is mapped to the booking information. This means the passenger's token will include his or her biometric data (e.g., facial signature, etc), and also data determined based on the initial booking information, which information can be airport, gate, airline, terminal, flight time, etc. The determined data may comprise a list of touchpoint databases into which the passenger's biometric record should be included. It may also comprise a timing data for including the biometric record into the databases. The list will be updatable on the basis of one or more of airport dynamics, flight dynamics, and passenger progress, as described previously. The mapping module 210 may further be configured to determine a listing of one or more touchpoint databases, in which the passenger's token is not currently included, but will be modified to include the passenger's token in the future.

In the scenario where particular passengers have permanent biometric records, the passenger token may also be permanent, including the biometric record and data determined based on the initial booking information. The passengers' tokens are stored in a passenger token database 214. The tokens are also updatable due to changes in flight data or airport data, as described above.

The number of records in the passenger token database 214 may be different from the number of records in the central enrolment database 116 mentioned in respect of FIG. 1. For instance, the central enrolment database 116 may be refreshed regularly, whereas the passenger token database 214 may be updated more frequently, e.g., where every time a flight departure occurs, passenger tokens of passengers booked for that flight may be subsequently removed.

The passenger token database 214 is accessible by a translation module 218. The translation module 218 is configured to selectively include the tokens into one or more of the touchpoint databases 118, . . . 128, or selectively remove the tokens therefrom, to modify the galleries at these databases. The translation module 218 may be implemented by a separate translation server.

The mapping module 210, the translation module 218 and the enrolment API 204 may be provided by separate servers (i.e., translation server and enrolment server) instead of being run on the same server as shown. The mapping module 210 may also be provided on the same separate server as the translation module 218.

The selective inclusion or removal for each token is done according to the token's listing of touchpoint databases which are set to include the passenger's token. If a touchpoint database which currently includes the passenger's token is no longer included the listing in the token, the token will be removed from that touchpoint database. If a touchpoint database does not currently include the passenger's token but is included in the listing, then the passenger's token will be added to that touchpoint database.

The listing may be modifiable according to an activation schedule. The modification may also be triggered by changes in airport and flight information, which the system is configured to detect as it has access to DCS and airport data. Modification to the listing of touchpoint databases may also be driven by the movement of the passenger through the network of touchpoints. The movement is reflected by confirmations of successful DCS transactions at particular touchpoints.

Figures 2, 3:
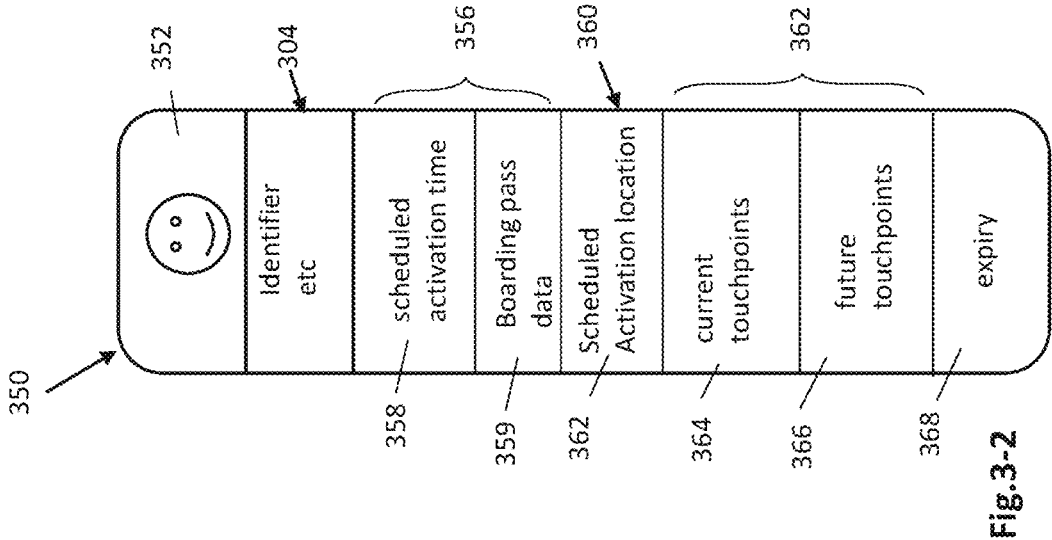
Figures 1, 3:
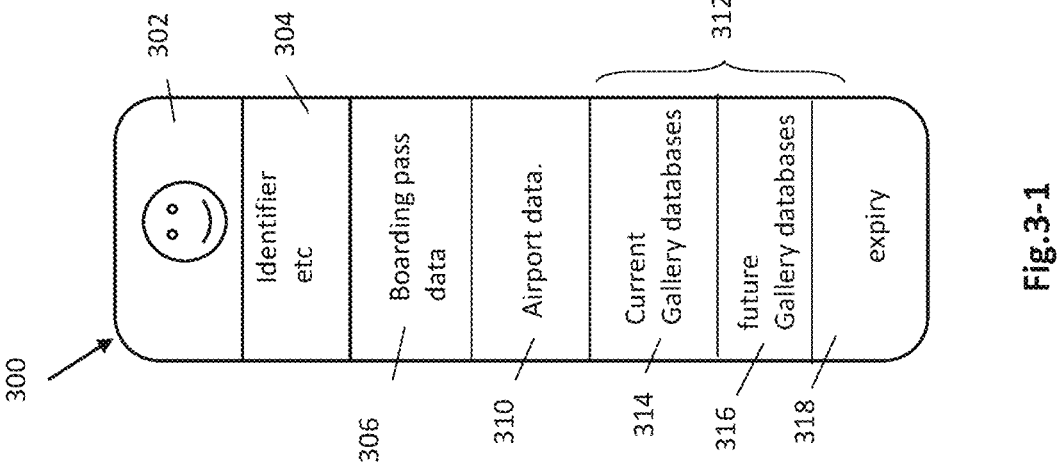

FIG. 3-1 depicts an example of a passenger's token 300. As shown, the biometric token 300 includes the passenger's biometric data or signature 302, such as a biometric template. These may be acquired during an enrolment process, from an identification document bearing a photo of the passenger, or both. The token 300 may also include one or more identifier data 304, such as a unique identifier assigned to the passenger, which allows the passenger's token to be unique identified. It may include passenger information such as name, birth date, nationality, but this information is not always required.

The token 300 includes boarding pass data 306. This can be implemented by providing one or more boarding pass data fields in the token 300. The boarding pass data will be generated by the airline DCS at the time of the passenger checking in, and will continue to be updated as required to reflect changes to the DCS information. The boarding pass data fields 306 may hold some or all of the data associated with the passenger's boarding pass. For instance, the fields may include timing fields such as flight open time, boarding time, departure time, etc. The fields may also a field in relation to the seat assignment for the passenger.

The token 300 further includes airport data 310, defining location information such as, but not limited to, airport, terminal, and gate. This can be implemented by providing one or more airport data fields. In embodiments where passenger tokens are created prior to check-in, the airport data may be populated at the time of reservation. The airport data is updatable because the mapping module 210 is configured to access the airport data from the airport server, to ensure the airport data included in the token 300 is up to date.

As described earlier in relation to the mapping module 210, the mapping module 210 determines on the basis of the boarding pass data 306 and the airport data 310, and potentially other passenger journey data, in which touchpoint databases the passenger's biometric enrolment data should be included. These will define the touchpoints where the passenger can be biometrically matched. Thus, the token 300 includes a data field containing a list 314 of the touchpoint databases in which the passenger's token will be included. Once biometric matching occurs at a touchpoint, the passenger's biometric enrolment record will be removed from the corresponding touchpoint database. The listing 314 will thus be updated. This may also trigger the list 314 to be further modified to include another touchpoint database into which the passenger's token should now be included. The further inclusion will depend on the "activation schedule". The activation schedule is a schedule according to which the biometric enrolment for a passenger will be "activated" for the touchpoints, i.e., the passenger's token will be included into the corresponding touchpoint databases so that the 1:N matching can be performed at those specific touchpoints.

The passenger may be "activated" for different touchpoints, i.e., having his or her token and/or biometric (enrolment) data added to the touchpoint databases for the touchpoints (this has also been described as the passenger's token being assigned to the galleries), according to a particular order set by the activation schedule. That is, the passenger is able to access one or more of the touchpoints to be biometrically matched, before he or she can access one or more of the other touchpoints to be biometrically matched. Hence, an order of one or more of the multiple biometric device zones according to expected access to the biometric data of the user based on an activation schedule determined.

Accordingly, the token 300 may include a field 316 containing a list of one or more touchpoint databases into which the passenger's token is to be included at a later time. For example, these may include touchpoint databases for touchpoints where biometric matching is expected to occur later, e.g., touchpoint databases for touchpoints in a different airport, for a later leg of a multi-leg journey.

An expiry field 318 may be included to define when the token 300 will expire, i.e., be automatically deleted from the token database and all touchpoint databases.

FIG. 3-2 depicts another example of a passenger's token 350 which is mapped with up to date boarding pass data from the DCS and also up to date airport data. Similar to the token 300, token 350 includes biometric data 352 for the passenger, and one or more identifier data 354 for the passenger. In this example, and in the example shown FIG. 3-1, the identifier data 354 may comprise an enrolment ID generated by the Identity Management Platform (IMP) employed to manage passenger enrolment data.

In this example, the DCS data 356 in the token 350 include an activation time data 358. The activation time data 358 defines a time when, or a time frame in which, the passenger's biometric enrolment data will be included into the touchpoint database. For example, the time can be a flight open time. The "time frame" can be defined by an activation time and an expiry time. For instance, the time frame can be between the flight open time and a departure time. The activation time data 358 may define multiple time frames, during which the passenger's token should be included in different touchpoint databases. E.g., the passenger's token will be included in touchpoint databases for the check-in touchpoints during a "flight open" window for the purpose checking-in; a "boarding open" time frame can be set so that the passenger's token will be included in touchpoint databases for boarding gate touchpoints during a "boarding open" window for boarding, which may end when the flight departs. The activation time data 358 are updatable to include up-to-date data in relation to the various times.

The DCS data 356 may also include a boarding pass data field 359 which will contain some or all of the boarding pass information, as is the case for the token 300. Preferably the boarding pass data field 359 will include at least the passenger seat data.

The token 350 further includes one or more data fields for holding airport data 360, such as a scheduled activation location 362, e.g., Terminal 1—gate 57. The scheduled activation time 358 and the scheduled activation location 362 define when and where the 1:N biometric matching will be available. Changes to these fields are driven by updated data from the airport or the DCS.

The activation location field 362 does not need to be separately provided in all embodiments. For example, the listing 364 of touchpoint zones, where the 1:N biometric matching is to be possible for the passenger (by the passenger's token being included in the touchpoint databases) may already be restricted to those touchpoint zones within the scheduled activation location. For instance, each touchpoint zone included in the listing 364 may be defined in accordance with the airport and terminal in which the zone located, as well as the touchpoint function or type, such as Sydney-terminal 2—bagdrop, or Sydney-terminal 1—gate G27. Updates to airport data which affects the location information will also trigger an update to the touchpoint zone listing, by the mapping module 210. It will be appreciated that providing the listing of current touch point zones 364 satisfies the purpose of providing the listing of current touchpoint databases 314 in the token 300.

The listing 364 of the biometric device zones (or the listing of databases 314 in FIG. 3-1) may be considered a "passenger flow" data. This is because the modification to the listing 364 may be triggered by the passenger's flow or progress through the airport, from check-in to boarding.

Therefore, updates to the listing 364 will be driven by the airline DCS transactions. The DCS data are used to ascertain the progress of a passenger's movement through the network of touchpoints, to determine which touchpoint databases should include the passenger's token next, according to the aforementioned activation schedule. The result of this determination is used to update the token. The translation module or server can then move the passenger's token accordingly.

Therefore, given the same activation schedule, the timing of the assignment of the passenger into the various galleries according to the schedule may differ between different passengers depending on their progress.

Similar to the future listing of touchpoint databases 316 included for the token 300, the token 350 may include a future listing of touchpoint zones 366 where the passenger can be biometrically matched, i.e., included into the galleries stored in the touchpoint databases, at a future time or during a future time frame. The further listing of touchpoint zones 366 may define touchpoint zones where the passenger will only be able to access, after there has been a successful biometric match at one of the touchpoint zones where the passenger is included in the corresponding touchpoint databases. The further listing of touchpoint zones 366 may define touchpoint zones located in a future leg of a multi-leg journey.

It will be appreciated that the lists 364, 363 of touchpoint zones may instead be lists of databases, as in the case of the token 300 shown in FIG. 3-1.

In this example, the "token" 350 further includes an "expiry" data 368, similar to the token 300 shown in FIG. 3-1. The expiry data 368 may define the amount of time the data may stay on the system, before being automatically deleted. This is separate to the activation schedule. For instance, with reference to FIG. 1, at the expiry time, the record may be automatically deleted from the token database 214, which provides the data source for the touchpoint databases 118 to 128.

Figures 4, 5:
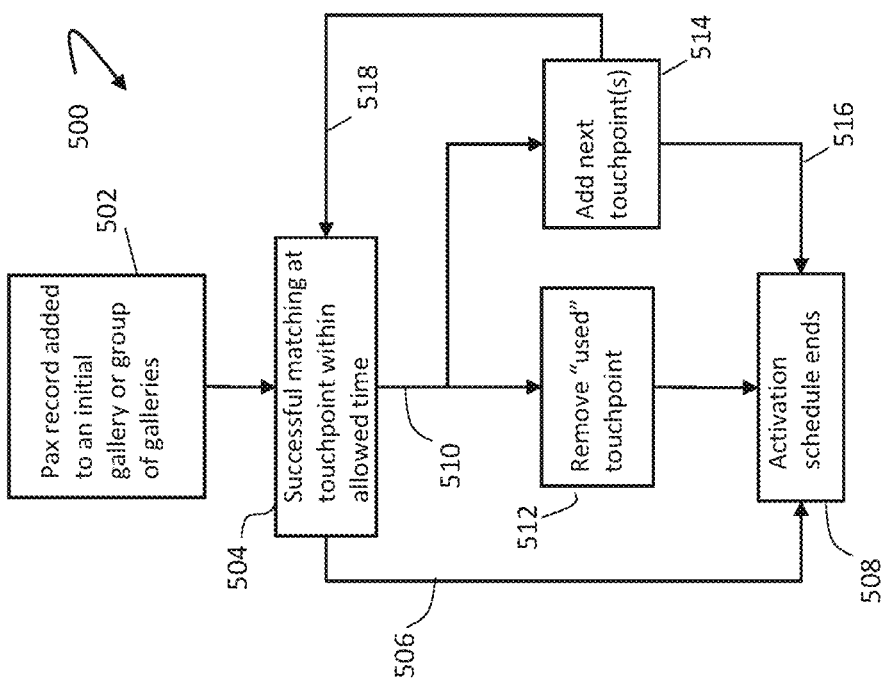
FIG. 4 depicts an example activation schedule.
FIG. 5 depicts an example process for progressing through an activation schedule, in accordance with an embodiment of the present disclosure.

An example of an activation schedule is shown in FIG. 4. In the example schedule 400, the touchpoints in a network are organised into first, second, third, and fourth groups 402, 404, 406, 408, each belonging to a touchpoint zone. Each group may have one or more sets of touchpoints, each set comprising one or more touchpoints of a particular type. Touchpoints in the same group will access the same touchpoint database.

The groups or zones are sequentially or chronologically organised. For instance, the touchpoint databases for the fourth group 408 typically will be the last ones to receive the passenger's token from the translation module 218. The touchpoint databases for the touchpoints in the third group 406 typically will not receive the passenger's token before touchpoint databases for the touchpoints in the second group, and the touchpoint databases for the touchpoints in the second group 406 typically will not receive the passenger's token before touchpoint databases for the touchpoints in the first group In this example, touchpoints in the first group 402 include ACUS counter touchpoints 410 and the self-help kiosk touchpoints 412, i.e., typically those at checkpoints that passengers may access upon initial arrival at the airport. Touchpoints in the second group 404 include baggage drop touchpoints 414 and security screening touchpoints 416. The first and second groups 402, 404 are "landside" groups. Touch points in the third group 406 in this example include the lounge access touchpoints 420, and any other touchpoints for granting biometric access to other areas on the airside of the airport. For instance, there can potentially be duty-free shopping access touchpoints 418. Touchpoints in the fourth group include one or more boarding gate touchpoint 422. The third and fourth groups 406, 408 are "airside" groups.

It will be understood that the types of touchpoints included in each group in the example schedule 400 are example only, serving to illustrate the generalised concept of a non-simultaneous inclusion of a passenger's token in the touchpoint databases, where the inclusion is performed according to the "activation schedule" and the timing of the inclusion is affected by the reservation information or DCS data such as flight open time, boarding time, etc, and the passenger's progress through the airport.

It will be understood FIG. 4 provides an example only. In practical applications, the activation schedule may depend on the configuration of the touchpoints available at an airport. For instance, at an airport where the only biometric touchpoints are at the ACUS counter(s) and the boarding gate(s), then there are only two touchpoint databases. It will also be understood the concept of ordered activation is applicable to any network of touchpoints where the presently disclosed system is deployed.

Further, different activation schedules may be set for different passengers. For instance, for a passenger who needs to complete an on-airport enrolment, touchpoints in the first group 402 should be accessed first, and hence the passenger's token should be added to the databases for those touchpoints first. However, for a passenger who has successfully completed off-airport enrolment and check-in procedures, the inclusion of the passenger's token into the databases of the touchpoints in the first group may be bypassed, or possibly, the passenger's token may be included into the databases of the touchpoints in both the first and second groups 402, 404.

In another scenario, once the passenger checks-in at the counter or the kiosk, the passenger's token may be made available to the databases of the touchpoints in one or more of the remaining touchpoint zones. For example, referring back to FIG. 1, after a passenger has been successfully matched at an ACUS check-in touchpoint 102, the remaining touchpoints include the bag-drop touchpoints 106, security screening touchpoints 108, lounge touchpoints 110, and boarding gate touchpoints 112. The self-service kiosk 104 touchpoints may not be considered to be "remaining" touchpoints, as it is intended for the same function as the ACUS check-in touchpoint during the passenger's movement through the airport's touchpoint network.

In another scenario, once the passenger checks-in at the counter or the kiosk, the passenger's token may be made available to the databases of the touchpoint zones that are accessible by passenger. For example, again referring to FIG. 1, once a successful biometric matching has occurred for a passenger either at an ACUS counter 102 or a self-service touchpoint 104, the passenger's token will be included into the databases for the bag-drop touchpoints 106 and the security screening touchpoints 108, because these are in touchpoint zones accessibly by the passenger. Therefore, according to the schedule, the updated list of touchpoint databases (314, FIG. 3-2) for the passenger's token will not include the databases of any of the airside touchpoints, as the passenger has not yet passed the security screening touchpoints.

In another alternative, the passenger's token may further be included into the databases for the touchpoints in one or more zones which are not yet accessible by the passenger as they are in a next stage of the passenger's movement through the airport, even if they are not necessarily accessible yet. This may be useful in airports in which biometric touchpoints are not provided at all of the checkpoints.

The system may have stored therein, or have access to, one or more predefined rules in relation to how to manage the galleries stored in the databases for particular touchpoints.

Generally, a passenger's token or biometric data may be added to the touchpoint databases from a start time as defined by a flight time data (e.g., flight open time), and removed from the databases on the basis of the passenger's progress through the schedule according to access progression events. Deletion of the passenger's token from the touchpoint databases may be governed by different rules, e.g., defining access progression events, for different databases. According to one rule, the passenger's token may only be deleted from the touchpoint database when the record is also deleted from the central database. This rule may for example be applied to the ACUS counter touchpoint database. According to another rule, the passenger's token will be deleted from a touchpoint database in accordance with the passenger's progress through the activation schedule. For instance, a passenger's token may be deleted from the touchpoint databases for bag-drop touchpoints and security screening touchpoints once the passenger passes through the security screening. According to still another rule, the passenger's token will be deleted from the touchpoint databases at a time which is set according to a boarding pass data. For instance, the passenger's token may be deleted from all of the touchpoint databases when the flight departs.

The system may be configured to add or delete a passenger's token to the touchpoint databases in accordance with one or more algorithms. The algorithms implement one or more of rules for defining how to progress from one touchpoint group to the next in an activation schedule, i.e., defining access progression events.

According to one rule, a touch point group will include at least one set of touchpoints in a designated touchpoint zone, where detection of a successful biometric match for a passenger at any of the designated touchpoints in the designated zone will cause the passenger's token to be deactivated for (i.e., deleted from the database) all of the touchpoints in the group. If applicable, the detected match will also trigger the passenger's token to be added to the touchpoint databases for all the touchpoints in the next group. For instance, with reference to FIG. 4, detection of a successful match at the security screening touchpoint 416 will cause the passenger's token to be "activated" (added to) for all touchpoints in the second group 404, in the third group 406.

Alternatively, if a touchpoint group does not include any designated touchpoints aforementioned, a successful match for the passenger needs to have occurred for each touchpoint set in the group, before the passenger's token can be added to the touchpoint databases for the touchpoints in the next group.

According to another rule, the progression to a touchpoint group is only possible in a group-specific activation time frame. This rule may be used in combination with either one of the above-mentioned rules. For instance, with reference to the example activation schedule 400 shown in FIG. 4, a passenger's token can only be added to the database for the boarding gate touchpoint 422, upon detection of the passenger being matched at a security screening touch point 416, and also if the current time is in a "gate open" time frame.

There may be different rules to define whether a passenger will remain 'activated' for a particular touchpoint set, after the passenger has been biometrically matched with the gallery in the touchpoint database at any of the touchpoints in the set. According to one rule, the passenger will remain "activated' (i.e., record still included in the touchpoint database) for a particular time frame, irrespective of the number of times successful matching may occur. An example is the lounge touchpoints 420, in whose database the passenger's token will remain until a "gate open" or "flight closed" time. According to an alternative rule, a passenger will be "deactivated" in respect of a touchpoint set (i.e., passenger's token removed from the touchpoint database for the touchpoint set) if the passenger has been matched once at any touchpoint in that set. The boarding gate touchpoints are an example. The security screening touchpoint set 416 are another example, in cases where each passenger is only allowed a onetime access through the security screening checkpoint.

An example of how a passenger is "activated" or "deactivated" for different touchpoints, on the basis of the passenger's movement as detectable through updates in the DCS data, is explained with reference to FIG. 5. In this example, activation of any touchpoint in one group will trigger activation of touchpoints in the next group, and the passenger is to be removed from a touchpoint's gallery upon a successful biometric match at the touchpoint.

Generally speaking, an access progression event may be a successful match of the biometric data at one or more biometric devices of the current biometric device zone. In response to that event, the biometric data may be removed from the one or more biometric databases associated to the current biometric device zone.

Alternatively or additionally, an access progression event may be determining that the current time is an activation time for the subsequent biometric device zone. In response to that event, the biometric data may be added to the one or more biometric databases associated to the subsequent biometric device zone.

Alternatively or additionally, an access progression event may be determining that the current time is at or after an expiry time for the current biometric device zone. In response to that event, the biometric data may be removed from the one or more biometric databases associated to the current biometric device zone.

Referring to FIG. 5, at step 502, at the start of the time frame defined by the "flight open window" field 308, the passenger's token will be added to the databases for one or more initial touchpoint sets.

At step 504, a successful biometric matching occurs at a touchpoint which belongs to one of the initial touchpoint sets. In the event that the match occurred at the boarding gate (arrow 506), the passenger activation process ends, and the "boarding" transaction will be confirmed. The passenger is "deactivated" for all touchpoints (i.e., record removed from all touchpoint databases) at step 508.

Otherwise, provided the current time is still within the "flight open" window, the system updates the list of databases in which the passenger's token is included (arrow 510). Updating the listing of activated touchpoints includes, at step 512, removing from the list the touchpoint database corresponding to the touchpoint where the successful matching occurred. This will cause the biometric enrolment record for the passenger to be deleted from the touchpoint database. For example, if a passenger has completed bag-drop at a biometric bag-drop touchpoint, the biometric enrolment record for that passenger may be deleted from the touchpoint database accessed by the bag-drop touchpoints.

The activation schedule for the passenger ends (step 508), if there are no more touchpoint types remaining where biometric matching for this passenger is needed (e.g., if the passenger has checked through a boarding gate touchpoint to board a plane), or if the activation time frame has ended.

At step 514 the system updates the list of databases in which the passenger's token is included, by including one or more touchpoint databases to the list, if there are still remaining touchpoint zones in the "activation schedule" that the passenger can access, and the "flight open" window has not ended (or the flight has not departed). For instance, the mapping module will add all of the touchpoints belonging to the next group in the activation schedule into the list.

If no further matching occurs before the activation time frame(s) ends (arrow 516), the activation schedule ends at step 508. Otherwise, while the activation time frame is still open (arrow 518), the system continues from step 504 again if a successful biometric matching for the passenger has occurred.

Figure 6:
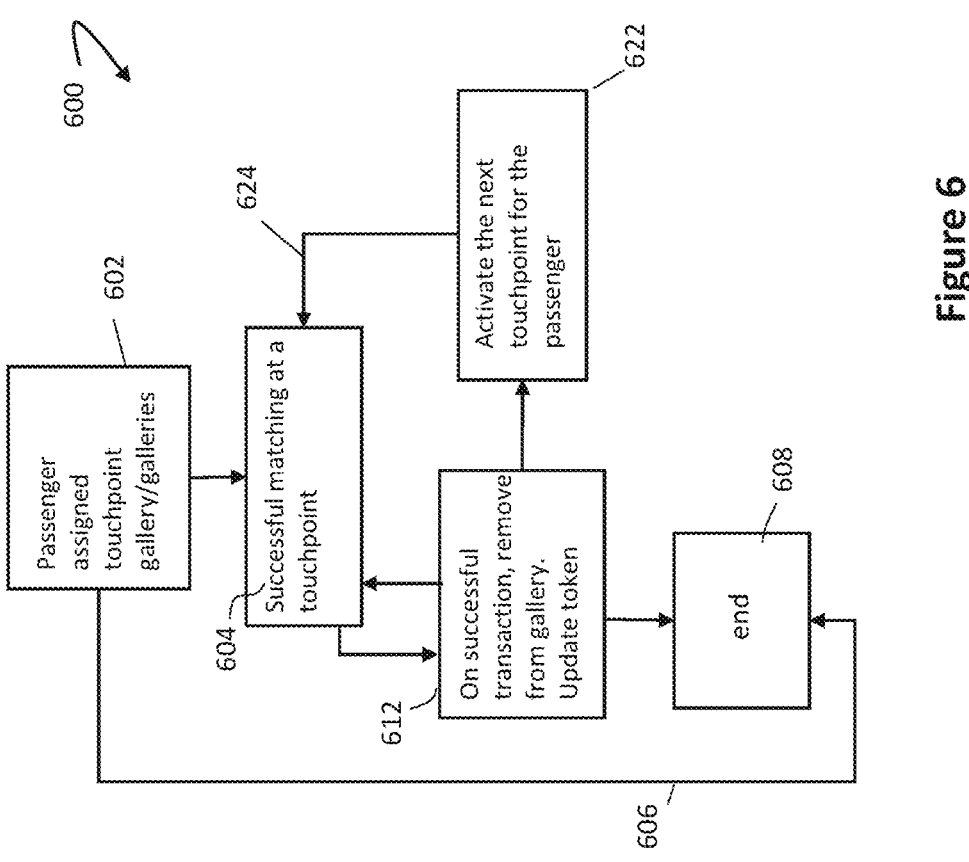
FIG. 6 depicts an example process for progressing through an activation schedule, in accordance with another embodiment of the present disclosure.

FIG. 6 provides a slightly varied activation process 600. At step 602, the passenger is assigned to one or more galleries—i.e., the passenger's token is included in one or more touchpoint databases. These are the databases for the touchpoints in the touchpoint zones which are accessible by the passenger. If a match for the passenger does not occur before a known expiry time (e.g., "flight closed" time), the process follows arrow 606 and ends at step 608, and the passenger's token is removed from all touchpoint databases. At this point the passenger's token is not necessarily removed from the central token database. Alternatively, at step 604, a successful matching occurs at a touchpoint, where the corresponding database has the passenger's token assigned thereto. At step 612, upon confirmation of the successful DCS transaction as a result of the successful match, the passenger's token is removed from the touchpoint database where the match occurred. Further, as the token includes the updated DCS data, the token will be updated.

Subsequent to step 612, if no further matches occur by the expiry time or if the touchpoint zone in which the match occurred is a last touchpoint zone in the schedule (e.g., boarding gate touchpoint zone), then the process ends at step 608. Alternatively, a further successful match may occur at another touchpoint whose corresponding touchpoint database includes the passenger's token, and the process return to step 604.

If there are further touchpoint zone or zones which the passenger is now able to access, then at step 622 the touchpoint databases for the touchpoints in those zones will be modified to include the passenger's token. The process then returns to waiting for a successful match to occur (arrow 624).

In some embodiments, in any of the groups of touchpoint zones in the activation schedule, there may be a particular touchpoint zone wherein a successful matching in that zone will trigger the passenger's token to be removed from the touchpoint database(s) for all of the touchpoints in that group. For instance, all of the touchpoint zones on the land side may be considered to be in a first group according to a schedule, and all of the touchpoint zones on the air side are in a second group in the schedule. A successful match at the security screening touchpoint zone may cause the passenger's token to be removed from all of the touchpoint databases for the touchpoint zones in group 1.

The aforementioned disclosure therefore provides a system and a method of mapping passenger's biometric enrolment data with DCS and airport data, and accordingly segmenting a central gallery into touchpoint zone specific galleries which will be of smaller sizes, to be stored in the corresponding touchpoint databases. As the tokens are mapped with live DCS and airport data, updates in DCS transactions or airport dynamics will also affect the segmentation of the gallery. Thus, the galleries at the touchpoint databases are dynamic—i.e., modifiable in response to one or more of: 1) updates to DCS transactions which capture the passengers' progress, 2) flight dynamics as will be obtained from the DCS data, 3) airport dynamics, i.e., updates to airport data.

Within this system, rather than accessing the all of the enrolment records and having to process the full gallery size, each touchpoint will only access records that are in their corresponding touchpoint database. Processing the smaller gallery size will reduce the biometric matching error rate.

Several aspects are in line with the disclosure. For example, in a first aspect, a computer implemented biometric token for a passenger is presented. The token comprises: a biometric data field, comprising a biometric data of the passenger; an identifier field, comprising a unique identifier assigned to the passenger; a database list field, comprising a list of databases into which the token is to be included, wherein the list of databases is configurable on the basis of one or more items of information in travel data in relation to a scheduled travel of the passenger. The list of databases is updatable in response to updates to the one or more items of information in the travel data.

In some forms, the travel data includes departure control system (DCS) data in relation to a flight.

In some forms, the travel data comprises an airport data in relation to the flight, the airport data being provided by an airport server, and updatable responsive to changes in airport dynamics associated with the flight.

In some forms, the list of databases is configurable on the basis of the one or more items of information in the airport data, or in the DCS data, or both.

In some forms, the DCS data comprises, at least, one or more of: boarding pass information, a flight open time, a flight number, a flight departure time, a seat assignment.

In some forms, the airport data comprises, at least, one or more of: an airport identifier, a terminal identifier, a boarding zone identifier, a boarding gate identifier.

In some forms, the token further comprises an activation time field, comprising an activation time data defining at least a time when the passenger can be assigned to the databases included in the list.

In some forms, the databases are segmented from a central token database, to be included into databases included in the list of databases. The segmentation is made based on the one or more of items of information as the items of information may trigger the list of databases to be updated.

In some forms, the token further comprises an expiry time field, comprising an expiry time data defining when the passenger is to be removed from all databases.

In some forms, an update to the list of databases is triggered by detection of an update in the airline DCS data from which occurrence of a DCS transaction can be determined.

In some forms, the update to the list of databases comprises removing a database from the list if the DCS transaction occurred after a match between the passenger and that database.

In some forms, the token further comprises a future database list field, comprising a second list of databases into which the token is to be included at a later time or during another leg of a multi-leg travel.

In a second aspect, herein disclosed is a method of modifying touchpoint databases for one or more biometric touchpoint zones within a biometric touchpoint network. The method comprising, for each passenger: receiving a biometric enrolment data for the passenger, and a scheduled travel data in relation to a scheduled travel for the passenger, the scheduled travel having an identifier assigned thereto; initialising a biometric token for the passenger which comprises, at least, the biometric enrolment data, and the scheduled travel data; determining a list of one or more of the biometric touchpoint zones which are accessible by the passenger, the list being for inclusion in the token, wherein a biometric touchpoint zone is accessible by the passenger if its corresponding touchpoint database includes the biometric enrolment data for the passenger, wherein each touchpoint database is configured to receive the biometric data for the passenger only if one or more items of information in the travel data for the passenger are of respective pre-determined values; obtaining from a travel configuration server any update in the travel data, and if it is determined from the updated travel data that there is a change in the one or more items of information: updating the scheduled travel data with the updated travel data, and updating the list of biometric touchpoint zones; and assigning the passenger's biometric enrolment data to the touchpoint databases included in the list, at an activation time which is set by the scheduled or the updated travel configuration data.

In some forms, obtaining the scheduled travel data comprises querying the travel configuration server to obtain the travel data corresponding to the identifier assigned to the scheduled travel, the travel data being updatable by the travel configuration server.

In some forms, the method further comprises assigning at least one or more of the biometric touchpoint zones to an activation schedule for the passenger, the activation schedule defining an order in which the passenger's biometric enrolment record will be included into touchpoint databases of the assigned one or more biometric touchpoint zones.

In some forms, the method further comprises: assigning the activation time to at least one of the biometric touchpoint zones included in the activation schedule, wherein the activation time is updatable in dependence of any update in the travel data corresponding to the identifier; and at the assigned activation time or an updated activation time, including the biometric enrolment data of the passenger into the touchpoint databases of at least one of the biometric touchpoint zones.

In some forms, the touchpoint activation schedule comprises one or more groups of touchpoint zones, each group including at least one touchpoint zone, wherein the groups are sequentially arranged, such that the passenger's biometric enrolment data will be added to touchpoint databases for touchpoints in a later group no earlier than touchpoint databases for touchpoints in an earlier group.

In some forms, a timing, of when the passenger's biometric enrolment record is added to or removed from touchpoint databases corresponding to the groups in the activation schedule, is set in dependence of the passenger's progress through the touchpoint network.

In some forms, the activation time extracted for each passenger comprises a time frame having a duration.

In some forms, the method further comprises: for each passenger, removing the passenger's biometric enrolment data from the touchpoint database for the touchpoint zones included in the list, at an expiry of the duration.

In some forms, the method further comprises: for each passenger, extracting an activation location data from the scheduled or updated travel data, the activation location data identifying one or more activation locations, wherein each biometric touchpoint zone included in the list is located at one of the activation locations.

In some forms, the method further comprises: querying or receiving, from a biometric matching engine, confirmation of any successful match of the passenger processed by the biometric matching engine; or querying a travel provider server, confirmation of any successful transaction by the passenger with the server;

In some forms, the method further comprises: upon confirming a successful transaction or match in respect of the passenger at any touchpoint in one of the biometric touchpoint zones, removing the passenger's biometric enrolment data from the touchpoint database for that biometric touchpoint zone.

In some forms, the method further comprises: upon confirming a successful transaction or match in respect of the passenger at any touchpoint of the biometric touchpoint zones belonging to one of the groups in the touchpoint activation schedule, adding the passenger's biometric enrolment data to the touchpoint database of at least one of the biometric touchpoint zones included in the next group in the activation schedule.

In some forms, the activation time extracted comprises an expiry time, wherein the passenger's biometric enrolment data will be removed from all touchpoint databases in which the data is included, at or after the expiry time.

In some forms, the network of touchpoints is provided in an airport, and the expiry time is a departure time for a scheduled flight.

In some forms, the activation time comprises two or more different time frames.

In some forms, the passenger's biometric enrolment data will be added to touchpoint databases for one or more biometric touchpoint zones at a first activation location, at a start time of a first one of the time frames, and will be added to touchpoint databases for one or more biometric touchpoint zones at a second activation location, at a start time of a second one of the time frames.

In some forms, the travel data comprises one or more of: an airport identifier, a terminal identifier, an airline code, a flight number, a time of flight, a flight open time, a flight closed time, a boarding time, a departure time.

In some forms, the passenger's biometric enrolment data is included the touchpoint databases for all of the touchpoint zones in the network.

In some forms, the method further comprises: deleting the biometric token for the passenger from a passenger token database, after removal of the biometric enrolment record for the passenger from the touchpoint databases.

In some forms, the removal from the central database occurs after expiry of a predetermined period of time after the removal from the touchpoint databases.

In a further aspect, herein disclosed includes a method of segmenting a passenger token database, in which there are stored a plurality of biometric tokens provide in accordance with the first aspect above, into one or more gallery databases. The method comprises: extracting or reading from each biometric token, a first list of one or more galleries, and an activation time data; adding the biometric token to one or more gallery databases, each corresponding to one gallery included in the first list of galleries, at an activation time defined by the activation time data.

In some forms, the method further comprises: detecting whether a match between a biometric enrolment data of any of the biometric tokens and one of the gallery databases has occurred.

In some forms, the method further comprises: upon detection of a match for a biometric token, removing the biometric token from the gallery database where the match with the biometric token occurred.

In some forms, the method further comprises: re-extracting or re-reading from the biometric token of a passenger, an updated list of one or more galleries, and adding the biometric token to the gallery databases corresponding to the updated list.

In some forms, the method further comprises: removing the biometric token for a passenger from gallery databases corresponding to the list of galleries in that biometric token, at an activation expiry time defined by the activation time data.

In some forms, the method further comprises: removing a biometric token from the passenger token database, at or after an expiry time defined in the biometric token.

In still another aspect, herein disclosed is a method for creating a compute-implemented biometric token for a passenger, comprising: obtaining biometric data of the passenger from an enrolment database; providing a biometric data field, comprising the biometric data; providing an identifier field, comprising a unique identifier assigned to the passenger; obtaining travel data in relation to a scheduled travel of the passenger from one or more travel servers; determining a first list of one or more databases into which the token is to be included, on the basis one of one or more items of information in the travel data; providing a database list field, and assigning thereto the first list of one or more databases.

In some forms, the method further comprises: detecting whether an update to any of the one or more items of information in the travel data has occurred; in response to detection of an update to the one or more items of information in the travel data, determining an updated list of one or more databases in to which the token is to be included on the basis of the update; and updating the list in the database list field with the updated list.

In another aspect, herein disclosed is a biometric touchpoint database management platform, comprising a central token database, a plurality of touchpoint databases each comprising data segmented from the central token database, wherein tokens included in specific instances of the plurality of touchpoint databases at each different point in time are dependent on travel data associated with passenger travel at that time; the platform further comprising a server or a distributed server arrangement, configured to execute instructions to perform a method in accordance with any of the aspects above.

In a further aspect, herein disclosed is a computer implemented system for providing biometric tokens. Each token comprises: a biometric data field, comprising a biometric data of the passenger; an identifier field, comprising a unique identifier assigned to the passenger; a database list field, comprising a list of databases into which the token is to be included, wherein the list of databases is configurable on the basis of one or more items of information in travel data in relation to a scheduled travel of the passenger; wherein the list of databases is updatable in response to updates to the one or more items of information in the travel data. The system comprises: a communication module for communicating with a biometric enrolment server and one or more travel servers; a token management module configured to create a token for each passenger, assign to the biometric data field of each token, a biometric enrolment data for the passenger from the biometric enrolment server, and assign a unique identifier to the identifier field for each token; a mapping module configured to, in respect of each passenger: obtain initial values of one or more items of travel information from the one or more travel servers, in respect of a scheduled travel of the passenger; based on the initial values of the one or more items of information, identify one or more databases, each identified database being configured to comprise only passenger tokens corresponding to passengers whose scheduled travels are associated with travel data that share a same value or all have values in a particular range of values, for at least one item of travel information; and assign the one or more databases to the database list field to provide the list of databases.

In another aspect, herein disclosed is a system for managing touchpoint databases for a biometric touchpoint network provided at a site, the network comprising one or more touchpoint sets, each touchpoint set comprising at least one touchpoint, the system comprising a processing arrangement. The processing arrangement comprises a mapping module in data communication with an enrolment database comprising passenger biometric enrolment data, and with a travel configuration server to obtain travel data, wherein the mapping module maps the passenger biometric enrolment data with the travel data to create passenger tokens, for storage in a token database. The processing arrangement further comprises a translation server configured to selectively include or exclude the passenger tokens in the token database in a touchpoint database for each touchpoint set, wherein each touchpoint databases is configured to comprise only passenger tokens that each have at least one item of travel information whose value is a predetermined value or within a predetermined range of values.

Variations and modifications may be made to the parts previously described without departing from the scope of the disclosure.

For example, in the processes of how the activated touchpoints are determined as depicted in FIGS. 4 and 6, the initially activated touchpoints are typically check-in counter or kiosk touchpoints. However, the determination of which touchpoints are initially activated may depend on the particular travel circumstances of the passenger and the specific airport touchpoint network. For example, if all of the biometric enrolment and check-in process has been completed prior to the passenger is "on" airport and there are no biometric touchpoints at the screening gate, the boarding gate touchpoints may be included in the initial activation. In cases where all enrolment and check-in process has been prior completed but there are biometric touchpoints at the security screening checkpoint, the boarding gate touchpoints will not be included.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of biometric data access in a biometric device environment comprising multiple biometric devices, wherein the multiple biometric devices are grouped in multiple biometric device zones, wherein a biometric device zone is associated to one or more biometric databases, the method executed by a biometric data access server system, the method comprising:

receiving biometric data of a user;

determining an order of one or more of the multiple biometric device zones according to expected access to the biometric data of the user based on an activation schedule;

in response to a start time of the activation schedule being reached, adding the biometric data to one or more of the biometric databases associated to at least a subset of the one or more of the multiple biometric device zones; and in response to an access progression event, removing the biometric data from one or more databases associated to a current biometric device zone and/or adding the biometric data to one or more databases associated to a subsequent biometric device zone, wherein the method further comprises:

receiving schedule data, wherein the activation schedule is determined based on the schedule data;

initialising a biometric token for the user, wherein the biometric token comprises the biometric data, the schedule data, and a list of the ordered one or more biometric device zones; and storing the biometric token in a biometric token database.

2. The method of claim 1, wherein the access progression event comprises a successful match of the biometric data at one or more biometric devices of the current biometric device zone, and wherein the method comprises, in response to successful match of the biometric data at one or more biometric devices of the current biometric device zone, removing the biometric data from the one or more biometric databases associated to the current biometric device zone.

3. The method of claim 1, wherein the access progression event comprises determining that the current time is an activation time for the subsequent biometric device zone, and wherein the method comprises, in response to determining that the current time is the activation time, adding the biometric data to the one or more biometric databases associated to the subsequent biometric device zone.

4. The method of claim 1, wherein the access progression event comprises determining that the current time is at or after an expiry time for the current biometric device zone, and wherein the method comprises, in response to determining that the current time is at or after an expiry time, removing the biometric data from the one or more biometric databases associated to the current biometric device zone.

5. The method of claim 1 further comprising:

obtaining an update of the schedule data; and updating the activation schedule and the list of the ordered one or more biometric device zones.

6. The method of claim 1, wherein adding the biometric data to one or more of the biometric databases comprises:

extracting the biometric data from a biometric token of the user according to the list of the ordered one or more biometric device zones and the activation schedule; and adding the biometric data to the one or more databases associated to at least a subset of the one or more biometric device zones.

7. The method of claim 1, wherein adding the biometric data to one or more of the biometric databases comprises:

determining the biometric token of the user according to the list of the ordered one or more biometric device zones and the activation schedule; and adding the biometric token comprising the biometric data to the one or more databases associated to at least a subset of the one or more biometric device zones.

8. The method of claim 1 further comprising deleting the biometric token from the biometric token database after deleting of the biometric data of the user from all of the biometric databases.

9. The method of claim 1, wherein the biometric token comprises a token expiry time, the method further comprising deleting the biometric token from the biometric token database and all of the biometric databases at or after expiry of the token expiry time.

10. The method of claim 1, wherein the biometric token further comprises a unique identifier assigned to the user.

11. The method of claim 1, wherein the biometric token further comprises an ordered list of databases associated to the ordered one or more biometric device zones.

12. A distributed server system of biometric data access, the system comprising multiple biometric databases, wherein multiple biometric devices are grouped in multiple biometric device zones, wherein a biometric device zone is associated to one or more of the multiple biometric databases, wherein the distributed server system is configured to execute the method of claim 1.

13. A computer program comprising instructions which, when the program is executed by a computer, cause the computer to carry out the method of claim 1.

* * * * *